United States Patent
Fang et al.

(10) Patent No.: US 7,496,451 B2
(45) Date of Patent: Feb. 24, 2009

(54) REAL TIME DATA QUALITY CONTROL AND DETERMINATION OF FORMATION ANGLES FROM MULTICOMPONENT INDUCTION MEASUREMENTS USING NEURAL NETWORKS

(75) Inventors: Sheng Fang, Houston, TX (US); Leonty Tabarovsky, Cypress, TX (US); Michael Rabinovich, Houston, TX (US); Liming Yu, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 164 days.

(21) Appl. No.: 11/368,906

(22) Filed: Mar. 6, 2006

(65) Prior Publication Data

US 2007/0208546 A1    Sep. 6, 2007

(51) Int. Cl.
G01V 1/28 (2006.01)
G01V 3/18 (2006.01)
(52) U.S. Cl. ............................ 702/7; 702/17
(58) Field of Classification Search ............... 702/1–14; 324/343, 339
See application file for complete search history.

(56) References Cited

U.S. PATENT DOCUMENTS

| | | | | |
|---|---|---|---|---|
| 4,302,723 | A * | 11/1981 | Moran | 324/343 |
| 4,360,777 | A * | 11/1982 | Segesman | 324/339 |
| 5,854,991 | A | 12/1998 | Gupta et al. | 702/7 |
| 6,381,542 | B1 | 4/2002 | Zhang et al. | |
| 6,393,364 | B1 * | 5/2002 | Gao et al. | 702/7 |
| 6,556,016 | B2 * | 4/2003 | Gao et al. | 324/343 |
| 6,574,562 | B2 | 6/2003 | Tabarovsky et al. | 702/7 |
| 6,636,045 | B2 | 10/2003 | Tabarovsky et al. | 324/343 |
| 6,643,589 | B2 | 11/2003 | Zhang et al. | 702/7 |
| 6,819,111 | B2 | 11/2004 | Fanini et al. | |
| 6,885,947 | B2 | 4/2005 | Xiao et al. | 702/17 |
| 6,925,384 | B2 | 8/2005 | Frenkel et al. | |
| 6,950,749 | B2 | 9/2005 | Frenkel et al. | |
| 2002/0007247 | A1 | 1/2002 | Cheng et al. | |
| 2003/0028324 | A1 | 2/2003 | Xiao et al. | |
| 2003/0105591 | A1 | 6/2003 | Hagiwara | |
| 2004/0059513 | A1 | 3/2004 | Bittar et al. | |
| 2004/0196047 | A1 | 10/2004 | Fanini et al. | |
| 2006/0173624 | A1 | 8/2006 | Frenkel | |

OTHER PUBLICATIONS

Kriegshauser, et al. "A New Multicomponent Induction Logging Tool to Resolve anisotropic Formations". SPWLA 41st Annual Logging Symposium, Jun. 4-7, 2000. pp. 1-14.

Rabinovich, et al. "Enhanced Anisotropy from Joint Processing of Multi-Component and Multi-Array Induction Tools". SPWLA 42nd Annual Logging Symposium, Jun. 17-20, 2001, pp. 1-11.

(Continued)

*Primary Examiner*—John E Barlow, Jr.
*Assistant Examiner*—Victor J Taylor
(74) *Attorney, Agent, or Firm*—Cantor Colburn LLP

(57) ABSTRACT

Neural networks may be used to determine and predict formation dip angles and perform quality assurance assessments from data collected with a multi-component induction tool used for well logging. The neural networks make use of corrected, rotated and normalized data to provide the predictions and assessments. Synthetic data using various models is used to train the neural networks. The teachings herein provide for real-time determinations with a substantial degree of accuracy in the results.

22 Claims, 12 Drawing Sheets

OTHER PUBLICATIONS

Yu, et al. "The Reduction of Near Zone Effects on the Multi-component Induction Logging Tool". Society of Petroleum Engineers Inc., SPE Annual Technical Conference and Exhibition held in Denver, Colorado, U.S.A., Oct. 5-8, 2003. 3 pages.

Zhang, et al. "Simultaneous determination of relative angles and anisotropic resistivity using multicomponent induction logging data". SPWLA 42nd Annual Logging Symposium, Jun. 17-20, 2001. pp. 1-11.

Zhdanov, et al. "Foundations of Tensor Induction Well-Logging". Petrophysics, vol. 42, No. 6 (Nov.-Dec. 2001); p. 588-610.

International Search Report for International application No. 594-41419-WO. Mailed Jan. 11, 2008.

PCT Written Opinion of the International Searching Authority for International application No. 594-41419-WO. Mailed Jan. 11, 2008.

* cited by examiner

REAL TIME DATA QUALITY CONTROL AND DETERMINATION OF FORMATION ANGLES FROM MULTICOMPONENT INDUCTION MEASUREMENTS USING NEURAL NETWORKS

BACKGROUND OF THE INVENTION

1. Field of the Invention

The invention is related generally to the field of interpretation of measurements made by well logging instruments for the purpose of determining the properties of earth formations. More specifically, the invention provides techniques for determination of formation dip and azimuth angles using induction measurements.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical properties of the formation and the fluids therein.

In thinly laminated sand-shale sequences or shaly-sand formations, the formation electrical anisotropy becomes important in determining the hydrocarbon saturation from the resistivity measurements. Due to the complexity of the formation, particularly the variations in the relative dip angle between the borehole axis and the formation dipping, determining the formation electrical anisotropy can be complicated. The deviation of the well and the rotation of the tool make determinations of anisotropy and other quantities more difficult.

There is a need for advanced methods for providing real-time determinations of the relative rotation of a measuring tool and formation dip angles, which provides users with information for further determining formation anisotropy. Preferably, the method should consistently provide accurate and reliable data and be computationally efficient.

BRIEF SUMMARY OF THE INVENTION

Disclosed is a method for determining a formation dip angle ($\theta$) for measurements taken with an electromagnetic induction well logging tool, the method including: using the tool, collecting measurement data for a plurality of main-components and a plurality of cross-components; processing the measurement data to one of remove and eliminate at least one of near-borehole effects and spacing bias from the measurement data to produce corrected components; calculating a rotation angle ($\phi$) for the tool using the corrected components; rotating selected corrected components to a direction where a value for one of the cross-components becomes zero; processing the rotated components to provide normalized components; and, using at least one neural network, predicting at least the formation dip angle ($\theta$) from the corrected, rotated and normalized components.

Also disclosed is a method for training at least one neural network including: selecting a processor for operation of a neural network; loading at least one model into the processor, the at least one model for predicting a formation dip angle from measurements taken in a wellbore with a multi-component well logging induction tool; selecting synthetic data for the at least one model, the model having parameters for predicting the formation dip angle; and, loading the synthetic data into the processor for training the at least one neural network.

Further disclosed is a computer program product stored on machine readable media comprising directions for predicting a formation dip angle, the directions including instructions for: using a multi-component well logging induction tool, collecting measurement data from within a wellbore for a plurality of main-components and a plurality of cross-components; processing the measurement data to one of remove and eliminate at least one of near-borehole effects and spacing bias from the measurement data to produce corrected components; calculating a rotation angle ($\phi$) for the tool using the corrected components; rotating selected, corrected components to a direction where a value for one of the cross-components becomes zero; processing the rotated components to provide normalized components; and, using at least one neural network, predicting at least the formation dip angle ($\theta$) from the corrected, rotated and normalized components.

Additionally, disclosed is a multi-component well logging induction tool, includes: a plurality of transmitter coils and a plurality of receiver coils, each plurality coupled to electronics for operating each of the pluralities, the electronics further coupled to a processor for receiving measurement data corresponding to a plurality of main-components and a plurality of cross-components; wherein the electronics are adapted for collecting measurement data for the plurality of main-components and the plurality of cross-components; and providing the measurement data to the processor for processing; processing the measurement data to one of reduce and eliminate at least one of near-borehole effects and spacing bias; the processor further having instructions for calculating a rotation angle ($\phi$) for the tool using the corrected components; rotating each of the corrected components to a direction where one of the cross-components becomes; providing normalized components for each of the main-components and each of the cross-components; and, using at least one neural network, predicting at least the formation dip angle ($\theta$) from the rotated and normalized components.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
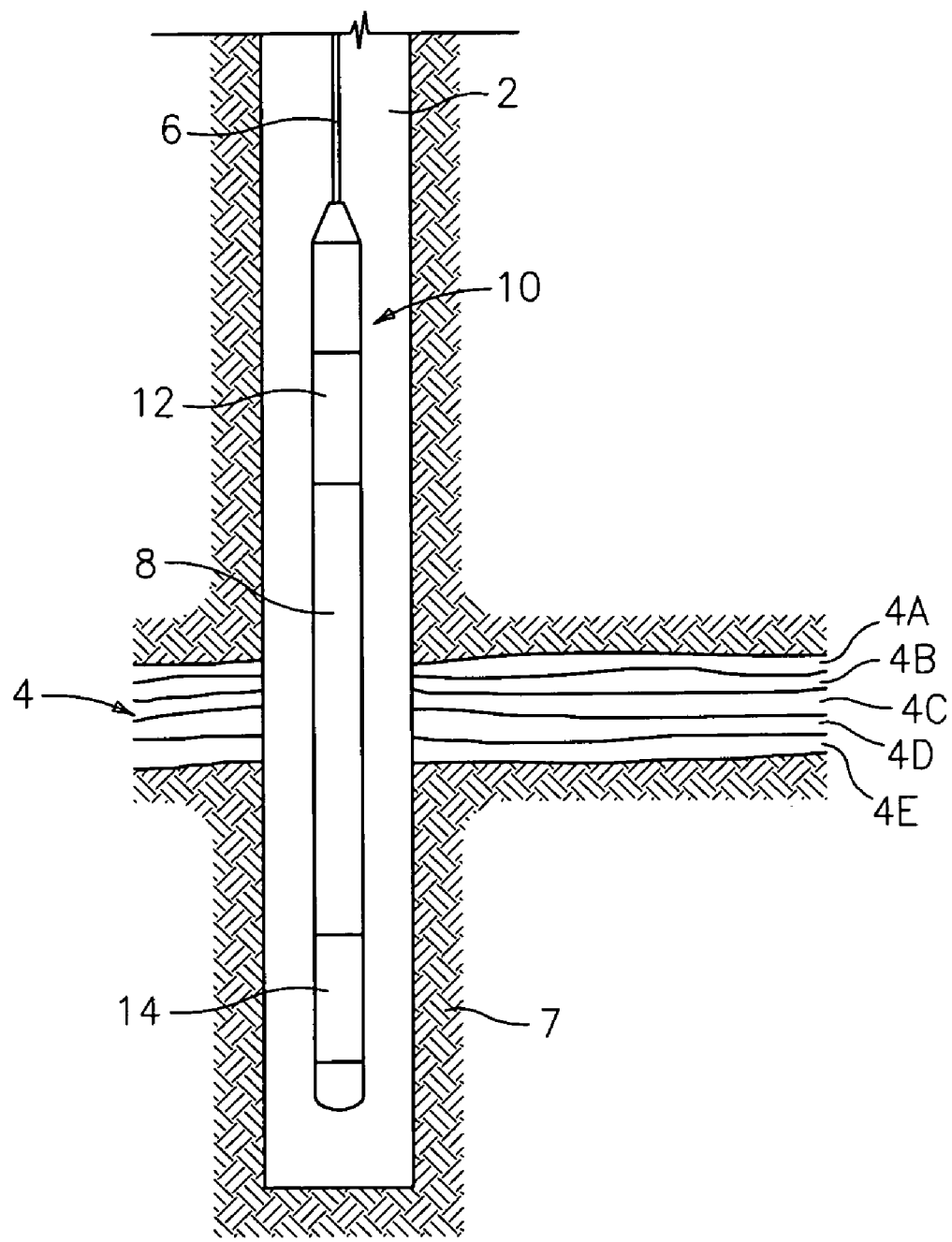
FIG. 1 depicts aspects of a well bore.

Referring to FIG. 1, an electromagnetic induction well logging tool 10 is shown disposed in a wellbore 2. The wellbore 2 is drilled through earth 7 and penetrates formations 4, which include various layers 4A-4E. The tool 10 is typically lowered into and withdrawn from the wellbore 2 by use of an armored electrical cable 6 or similar conveyance as is known in the art. The tool 10 is typically assembled from three subsections: an auxiliary electronics unit 14 disposed at one end of the tool 10; a coil mandrel unit 8 attached to the auxiliary electronics unit 14; and an electronics unit 12 attached to the other end of the coil mandrel unit 8, the electronics unit 12 typically being attached to the cable 6. As used herein, the well logging tool 10 may also be referred to as an "instrument 10" or a "multi-component induction tool 10."

The coil mandrel unit 8 includes a set of coils which includes induction transmitter coils and receiver coils. The set of coils, as will be further explained, are for inducing electromagnetic fields in the formations 4 and for receiving voltage signals induced by eddy currents flowing in the formations 4 as a result of the electromagnetic fields induced therein.

The auxiliary electronics unit 14 typically contains a receiver, signal processing capabilities and telemetry capabilities (not shown). The auxiliary electronics unit 14 also typically includes a signal generator and power amplifiers (not shown), which cause alternating currents of selected frequencies to flow through transmitter coils in the coil mandrel unit 8.

In typical embodiments, the electronics unit 12 includes receiver circuits (not shown) for detecting voltages induced in receiver coils in the coil mandrel unit 8, and circuits for processing these received voltages (not shown) into signals representative of the conductivities of various layers 4A-4E of the formations 4. As a matter of convenience, the electronics unit 12 typically includes signal telemetry to transmit conductivity related signals to the surface of the earth 7 via the cable 6 for further processing. Alternatively, the electronics unit 12 can store the conductivity related signals in an appropriate recording device (not shown) for processing after the instrument 10 is withdrawn from the wellbore 2.

Figure 2:
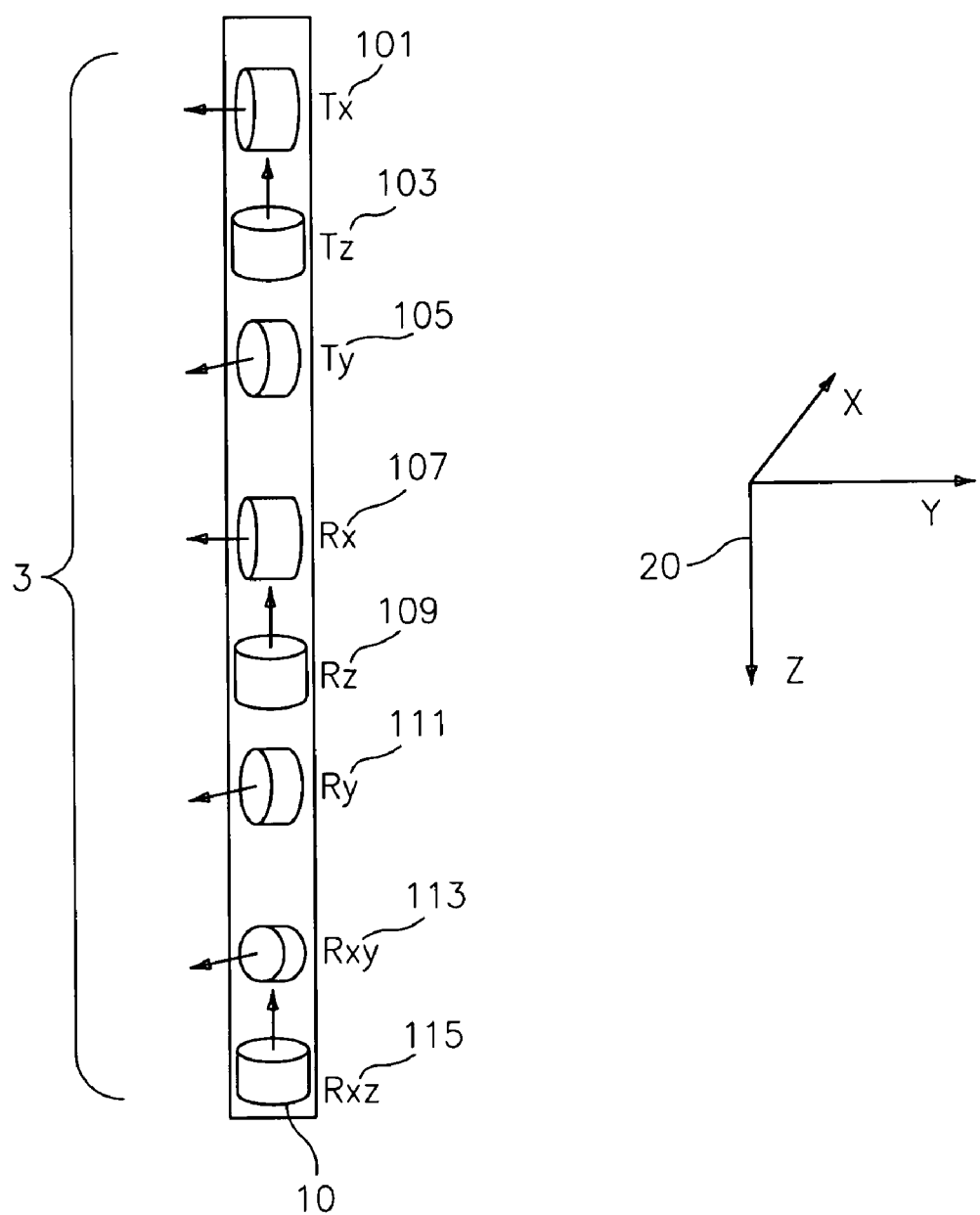
FIG. 2 depicts aspects of a well logging instrument.

Referring to FIG. 2, one embodiment of the set of coils 3 includes transmitter coils and receiver coils as shown. Three transmitter coils 101, 103 and 105, referred to as the $T_x$, $T_z$, and $T_y$ transmitters are substantially orthogonally oriented (the z-axis being along the longitudinal axis of the tool, as depicted in the legend). The transmitter coils 101, 103 and 105 generate magnetic fields for obtaining measurements in the formations 4 surrounding the wellbore 2.

Corresponding to the transmitter coils 101, 103 and 105 are receiver coils 107, 109 and 111, referred to as the $R_x$, $R_z$, and $R_y$ receivers, respectively. The receiver coils 107, 109 and 111 measure aspects of the corresponding magnetic fields, and are also are substantially orthogonally oriented to each other. Additional receiver coils 113 and 115 may be included and measure two cross-components $H_{xy}$, and $H_{xz}$ of the magnetic field (H) produced by the x-component transmitter. One non-limiting example of the tool 10 is the 3DExplorer™ tool, which is an induction logging instrument produced by Baker Hughes of Houston, Tex.

It should be recognized this FIG. 2 depicts one embodiment of the well logging tool 10, and is not limiting thereof. For example, in other embodiments, the additional coils 113, 115 are not included. Further examples include embodiments having transmitter coils and receiver coils with other or varying orientations.

Typically, the well logging tool 10 includes adaptations as may be necessary to provide for operation during drilling or after a drilling process has been undertaken.

As discussed herein, reference to the tool 10 and aspects thereof generally refer to the exemplary and non-limiting embodiment, the 3DExplorer™ tool 10. More information regarding the tool 10 may be had by turning to the paper "A new Multicomponent Induction Logging Tool to Resolve Anisotropic Formations" by Kriegshäuser, et al, SPWLA 41$^{st}$ Annual Logging Symposium, Jun. 4-7, 2000, the disclosure of which is incorporated by reference herein in its entirety.

As discussed herein, there are four coordinate systems involved in the processing of multi-component induction logging data. The four coordinate systems include one for each of the earth 7, the formation 4, the tool 10 and the coils 3. In typical embodiments, and by convention herein, the earth 7 coordinate system has a z-axis Z in the direction of gravity, an x-axis X pointing to the magnetic North, and a y-axis Y in the direction of magnetic East. The other three coordinate systems are defined relative to the earth coordinate system 20, depicted in FIG. 3A.

Figure 3A:
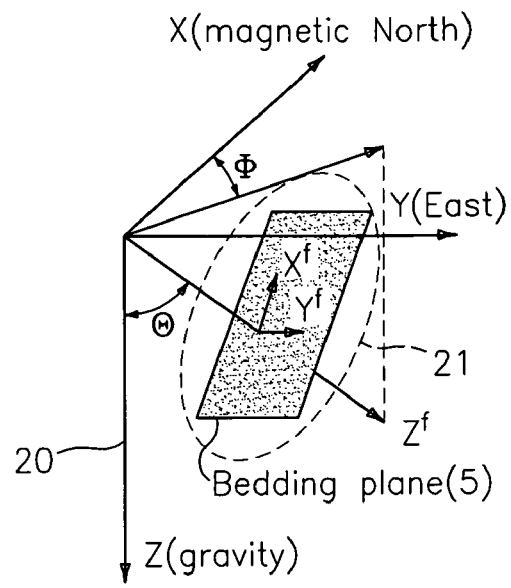
FIG. 3A and FIG. 3B, collectively referred to herein as FIG. 3, depict an earth coordinate system and a formation coordinate system.

Referring to FIG. 3A, the earth coordinate system 20 is shown, with the axes as described in the preceding paragraph. The formation coordinate system 21 is also depicted, and shown relative to the earth coordinate system 20. An z-axis $Z^f$ of the formation coordinate system 21 is normal to a bedding plane 5, while an x-axis $X^f$ and a y-axis $Y^f$ are on the bedding plane 5, each of the axes ($Z^f$, $X^f$, $Y^f$) being orthogonally oriented. Two formation angles, depicted as a formation dip angle (θ') and a formation azimuth angle (Φ) describe a relationship between the earth coordinate system 20 and the formation coordinate system 21. Typically, the formation dip angle (θ') and the formation azimuth angle (Φ) are determined by use of inversion processing. The tool coordinate system is depicted in FIG. 3B.

Figure 3B:
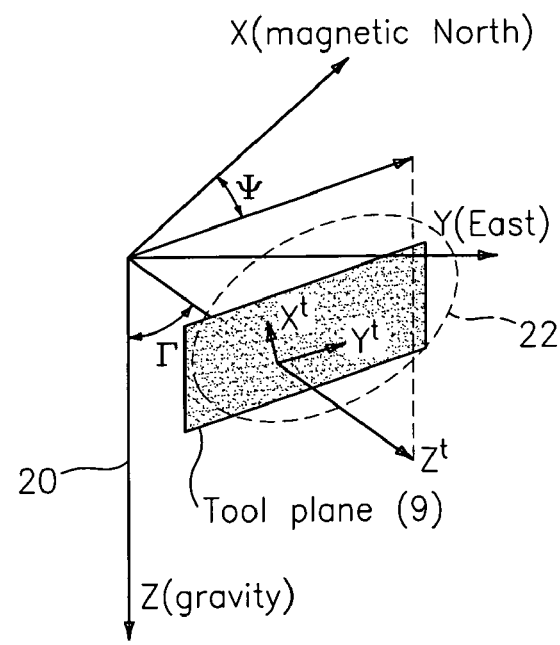

Referring to FIG. 3B, a z-axis $Z^t$ of the tool coordinate system 22 describes the trajectory of the wellbore 2 and is normal to a tool plane 9. The x-axis $X^t$ and the y-axis $Y^t$ of the tool coordinate system 22 are on the tool plane, each of the axes ($Z^t$, $X^t$, $Y^t$) being orthogonally oriented. The relation of the tool coordinate system 22 to the earth coordinate system 20 is described by a tool dip angle (Ψ) and a tool azimuth angle (Γ).

Figure 4:
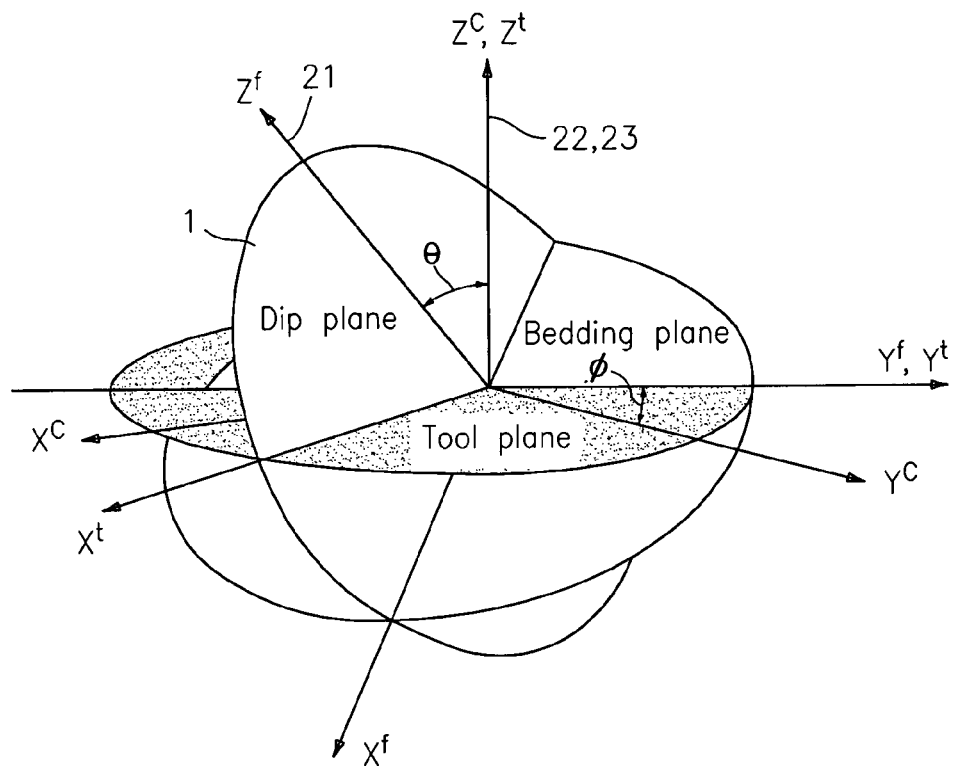
FIG. 4 depicts a tool coordinate system.

A combination of coordinate systems is depicted in FIG. 4. More specifically, the formation coordinate system 21, the tool coordinate system 22 and a coil coordinate system 23 are depicted in relation to each other. Referring to FIG. 4, a dip plane 1 is also shown. The dip plane 1 is described in the coil coordinate system 23, and includes an x-axis $X^c$, a y-axis $Y^c$ and a z-axis $Z^c$. The z-axis $Z^c$ of the coil coordinate system 23 shares the same z-axis $Z^t$ as the tool coordinate system 22, while the y-axis $Y^c$ of the coil coordinate system 23 is offset from the y-axis $Y^f$ of the formation coordinate system 21 by the formation azimuth angle (Φ). A relative tool rotation angle (φ) (not shown in FIG. 4) is described by the x-axis $X^c$ for the coil coordinate system 23, with respect to the high side of the wellbore 2.

In operation, the tool 10 measures co-axial and co-planer components called main components, and also measures cross-components. These measurements provide information to determine, among other things, resistivity and anisotropy of the formation 4. With this information, other salient information may be obtained or derived. For example, with tool orientation data, the formation dip angle ($\theta'$) and the formation azimuth angle ($\Phi$) can be obtained. As disclosed herein, algorithms based on and operational within neural networks can be used advantageously to check data quality and determine the formation dip angle ($\theta'$) and the formation azimuth angle ($\Phi$) in real-time, or near real-time.

As used herein generation of data in "real-time" is taken to mean generation of data at a rate that is useful or adequate for making decisions during or concurrent with processes such as production, experimentation, verification, and other types of surveys or uses as may be opted for by a user. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

The teachings herein provide for a high degree of quality control over the data. The quality control achieved is based on data consistency, and is typically provided on a real time basis. More specifically, by comparing the cross-components predicted (from the measured main components) with the measured cross-components, data consistency can be determined. Advantageously, the user may apply a desired quality control tolerance to the data, and thus draw a balance between rapidity of determination of the data and a degree of quality in the data.

In typical embodiments, the neural network is trained by application of synthetic data derived from a variety of models. The variety of models may be characterized by or include varying horizontal resistivity values for the formation 4, anisotropy coefficients, layer thicknesses, formation dip angles ($\theta'$), formation azimuth angles ($\Phi$), tool dip angles ($\Psi$), tool azimuth angles ($\Gamma$), relative tool rotation angles ($\phi$) and other inputs as may be deemed relevant during training of the neural network.

Figure 5:
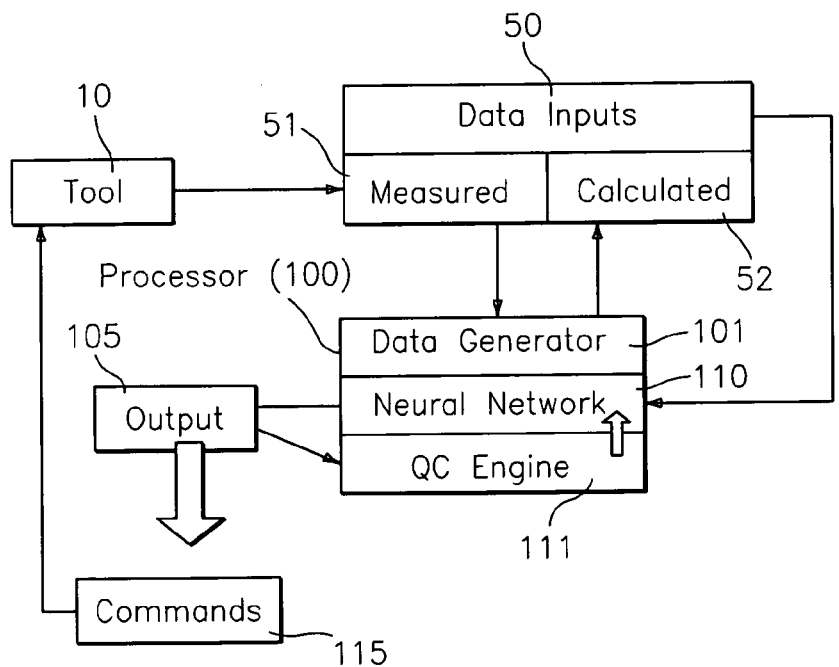
FIG. 5 is a flow chart depicting operation of a neural network.

Referring to FIG. 5, an exemplary overview of real time data quality control and data determination using a neural network 110 is provided. In FIG. 5, the tool 10 is used to provide measured data 51. The measured data 51 is used by a data generator 101 portion of a processor 100 to produce calculated data 52 using techniques as are known in the art. The measured data 51 and the calculated data 52 are grouped as data inputs 50 and used by the neural network 110 to produce output 105.

Note that "calculated" as used in this respect may include estimated and other similar techniques for derivation of quantities. More specifically, calculated data 52 may include data produced by at least one of calculation, estimation, and application of neural networks 110. Therefore, the term "calculated," as used in this respect, should be taken to mean generation of data that may be at least one of additional data and redundant data. Accordingly, calculated data is not limited to computational results for arithmetic processes and includes such additional data and redundant data as is described herein or as may be evident to one skilled in the art.

In typical embodiments, the neural network 110 includes data, instructions and information (as deemed appropriate by the user) to provide calculated data 52. For example, the neural network 110 may include an empirically derived algorithm to predict or estimate the calculated data 52 on the basis of measured data 51. The algorithm may be derived by a variety of techniques, including the use of synthetic data. In the embodiments making use of synthetic data, data is input into the neural network 110. Output of the neural network 110 is then obtained, and the algorithm (also referred to herein as a "model") is adjusted so as the desired output is obtained. This process, which may be referred to as training, tuning, calibration (or in other similar terms) may be used to provide for determination of desired quantities. Typically, the neural network 110 provides for implementation of optimization theories and statistical estimation. One skilled in the art will recognize that such techniques may also be adjusted to suit certain calculations. Further, such training techniques may occur during at least one of a process initiation or on an ongoing basis (i.e., where the neural network 110 "learns"). Aspects of the neural network 110 are discussed in greater detail further herein.

Aspects of the output 105 of the neural network 110 are compared to measured data 51 by use of a QC engine 111. Depending on the feedback from the QC engine 111, the neural network 110 may (or may not) recalculate the calculated data 52. That is, if there is a satisfactory correlation between the measured data 51 (cross-components) and predictions for the cross-components, then the calculated data 52 is of sufficient quality. However, if the predicted cross components vary unacceptably from the measured data 51 (cross components), then the prediction is typically refined by further operation of the neural network 110.

The output 105 may be used advantageously for at least one of rapid assessments of aspects of the formation 4 and adjustment to production. As one non-limiting example, the output 105 may be used to develop and provide commands 115 for guiding use of the tool 10. More specifically, the ouput 105 may provide operators with information that causes the generation of commands 115 for, as one example, adjustments in drilling direction.

The processor 100, as discussed herein, includes components as are known in the art for computational systems. For example, the processor 100 may include any one more of storage systems, input devices, output devices, memory, a system bus, audio and visual devices and others. As such components are known in the art, and not a part of the invention disclosed herein, these components are generally not discussed further herein.

Synthetic data are used to develop and train the neural network 110. Since the synthetic data are simulated by a layered one-dimensional code and the field data contain the near-borehole effects, a multi-frequency focusing (MFF) technique is applied to both synthetic and field data for minimizing such effects. MFF processing is known in the art. Reference may be had to the document entitled "The Reduction Of Near Zone Effects On The Multi Component Induction Logging Tool" by Yu et al., Society of Petroleum Engineers, Inc., 2003; as well as the document entitled "Enhanced Anisotropy Joint Processing Of Multi-Component And Multi-Array Induction Tools" by Rabinovich et al., SPWLA $42^{nd}$ Annual Logging Symposium, 2001, the teachings of in these documents being incorporated by reference herein in their entirety.

Although rotation of the tool 10 relative to the north is measured, the relative tool rotation angle ($\phi$) is unknown and depends on the formation strike direction that may vary from depth to depth. The relative tool rotation angle ($\phi$) can be determined by use of simple formula.

As disclosed herein, the relative formation dip angle ($\theta$) is determined directly from tool measurement data by use of the neural network 110. Once the neural network 110 is built using selected models, the determination of the relative formation dip angle (θ) becomes model-independent and very fast. Data quality can be ensured before estimating the relative tool rotation angle (φ) and relative formation dip angle (θ), by comparing the measured cross-component ($H_{xz}$) with the cross-component ($H_{xz}$) predicted from the three main components by use of another trained neural network 110. First, it is important to discuss aspects of the tool 10 in order to understand the data provided.

Referring again to FIG. 2, the electromagnetic induction well logging tool 10 typically (at least in the embodiments discussed herein) includes a series of transmitters 101, 103, 105 and a series of receivers 107, 109, 111. During operation, the tool 10 generates a set of magnetic field data (H) having nine components. Five of these components ($H_{xx}$, $H_{yy}$, $H_{zz}$, $H_{xy}$, $H_{xz}$) are unique amongst the set. Reference may be had to the document "A New Multicomponent Induction Logging Tool to Resolve Anisotropic Formations" by Kriegshäuser, B., et al, SPWLA 41$^{st}$ Annual Logging Symposium, 2000; which discloses a multi-component induction logging tool. The teachings of this document are incorporated be reference herein in their entirety.

Typically, the tool 10 provides a total of fifty measurements that include measurements for the five unique components ($H_{xx}$, $H_{yy}$, $H_{zz}$, $H_{xy}$, $H_{xz}$) using ten separate or distinguishable frequencies. In this embodiment, the spacing between the respective transmitter and receiver is 1.6 m for the three main components ($H_{xx}$, $H_{yy}$, $H_{zz}$), 2.0 m for ($H_{xz}$), and 2.4 m for ($H_{xy}$). The tool rotation angle (φ) may vary from 0 degrees to 360 degrees. The formation dip angle (θ) is between 0 degrees and 90 degrees.

Further to an overview of aspects of the teachings herein, in order to remove near borehole effects, a multiple frequency focus (MFF) technique is applied to each component of the magnetic field. After the MFF processing, any near borehole effect or bias in the data due to spacing between the series of transmitters 101, 103, 105 and the series of receivers 107, 109, 111 is reduced or removed. Typically, simple formulae can be used to determine the relative rotation angle from the corrected data resulting from the MFF processing. Once the relative tool rotation angle (φ) is determined, the corrected data are then rotated to the principle direction (0 degrees relative tool rotation angle (φ)). After the rotation, the rotated cross-component ($H_{xy}$) becomes zero whereas the main component ($H_{zz}$) remains unchanged. The remaining components of the measurements are annotated by corresponding prime markers (').

Based on the rotated components ($H_{xx}$'), ($H_{yy}$'), ($H_{xz}$'), and the unchanged component ($H_{zz}$), the relative formation dip angle (θ) is predicted by use of a trained neural network 110. Typically, the neural network 110 is trained by use of a substantial amount of data that includes or is derived from various model parameters, including parameters such as the horizontal resistivity, anisotropy coefficient, and thickness; as well as by use of a substantial number of models (as may be appropriate).

A normalized value for the cross-component ($H_{xz}$') is predicted from the three normalized main components ($H_{xx}$'), ($H_{yy}$'), and ($H_{zz}$). By checking the consistency between the measured normalized component ($H_{xz}$') and the predicted normalized component ($H_{xz}$'), the quality of the measurements can be determined. Typically, if the consistency between measurements is good, so is the data quality.

In some embodiments, in order to cover common situations, model parameters are selected where the horizontal resistivities are 1, 3, 9, and 27 Ohm-m; the anisotropy factors are 1, 3, and 9 (which are used to derive the corresponding vertical resistivities); and the thicknesses of the layers 4A-4E are 1, 2, and 3 m.

Therefore, considering all possible combinations forms a depth profile for a formation 4 having 743 layers. Synthetic responses are generated for the tool 10 using a one-dimensional code (e.g., DIPMAG) for different formation dip angles (θ) and different relative tool rotation angles (φ). In this embodiment, the formation dip angles (θ) used are 0, 15, 23, 30, 38, 45, 50, 54, 60, 65, 70, 75 degrees with a 0 degree fixed relative tool rotation angle (φ). The relative tool rotation angle (φ) is varied from 0 degrees to 360 degrees with a 15 degree interval for the dip angles of 30 degrees and 60 degrees. Relying upon this design, in this embodiment, the five collocated components ($H_{xx}$), ($H_{yy}$), ($H_{zz}$), ($H_{xy}$), and ($H_{xz}$) and two real spacing cross-components ($H_{xy}$) and ($H_{xz}$) are then calculated.

In order to better understand the process for determining rotation and dip angles 500, each stage in the process is now explained in further detail. By reference to an exemplary procedure for the teachings herein.

Figure 6:
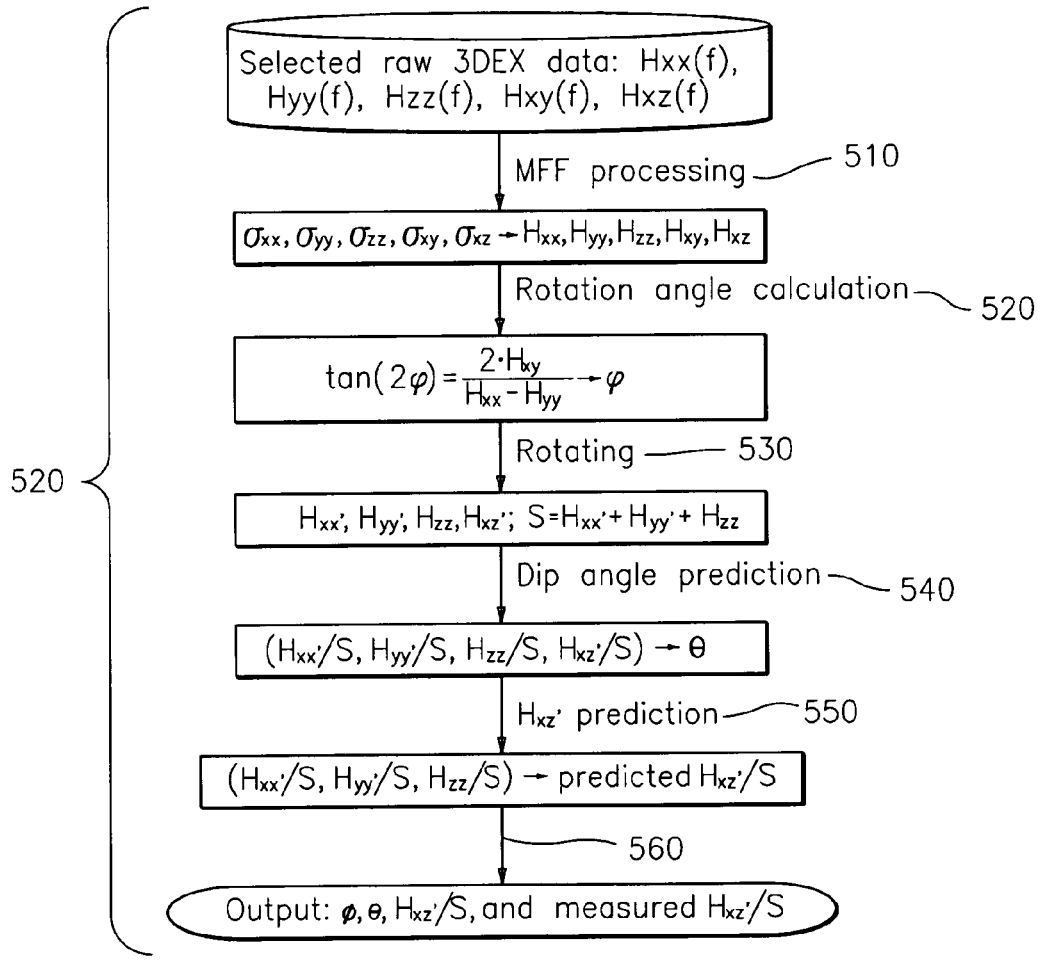
FIG. 6 depicts an exemplary process for determining relative rotation and formation dip angles and for data quality control.

Referring to FIG. 6, there is shown an exemplary procedure 500 for determining the relative tool rotation angle (φ) and the formation dip angle (θ'). Once data has been obtained from the tool 10, MFF processing 510 of the measured data 51 is completed. Subsequently, a rotation angle (φ) calculation 520 is completed. The relative tool rotation angle (φ) is then used for rotating 530, formation dip angle prediction 540, $H_{xz}$' prediction 550 and generating output 560.

FIG. 6 also depicts aspects of the present teachings wherein the procedure 500 calls for using the neural network 110, typically during generating output 560, to predict the normalized component $H_{xz}$'/S. Quality control of the data may be then undertaken by comparing the predicted value for the normalized component $H_{xz}$'/S with a measured value for the normalized component $H_{xz}$'/S.

MFF Processing 510

Borehole and invasion effects always exist and affect, to some extent, data gathered with the tool 10. In an exemplary embodiment, MFF processing 510 is applied to the measured responses of the tool 10 to at least one of reduce and eliminate the near-borehole effects so that the one-dimensional layered model can be used. If the output of MFF processing 510 is conductivity (σ), then a user needs to convert the output back to the magnetic field data (H) for further processing to determine the relative tool rotation angle (φ) and the relative formation dip angle (θ'). Therefore, for multiple frequency focus (MFF) processing 510, the relationship between the conductivity and the magnetic field data (H) is given as one of:

$$\sigma_{MFF} = K \cdot \text{sign}(H_{MFF}) \cdot |H_{MFF}|^{2/3} \quad (1);$$

and $$H_{MFF} = \frac{1}{K} \text{sign}(\sigma_{MFF}) \cdot |\sigma_{MFF}|^{1.5}; \quad (2)$$

where K is a constant factor for describing aspects of the tool 10. Further, MFF processing 510 is typically applied to account for and one of remove and eliminate bias in measurement data arising from spacing differences between the transmitter coils 101, 103, 105 and the receiver coils 107, 109, 111. As used herein, MFF processing 510 (and other similar techniques for correcting the measurement data) produce corrected components.

Rotation Angle φ Calculation 520

Calculation of the relative tool rotation angle (φ) is typically completed through a few calculations. First, a convention is established where prime is used to stand for the various components at the zero rotation angle (φ). At any rotation angle (φ), the following relation is given:

$$H = R_\phi^T H' R_\phi \quad (3)$$

where:

$$H = \begin{bmatrix} Hxx & Hxy & Hxz \\ Hyx & Hyy & Hyz \\ Hzx & Hzy & Hzz \end{bmatrix}; \quad (4)$$

$$R_\varphi = \begin{bmatrix} \cos(\varphi) & \sin(\varphi) & 0 \\ -\sin(\varphi) & \cos(\varphi) & 0 \\ 0 & 0 & 1 \end{bmatrix}; \text{ and,} \quad (5)$$

$$H' = \begin{bmatrix} Hxx' & 0 & Hxz' \\ 0 & Hyy' & 0 \\ Hzx' & 0 & Hzz' \end{bmatrix}. \quad (6)$$

Note the cross-components related to the y direction have zero values. This is true when the model is symmetric about a y=0 plane. However, when the tool 10 is eccentric, the cross-components for the y direction are not zero. Typically, after MFF processing 510, a near-borehole non-symmetric feature is removed and the model can be seen as a one-dimensional model that is symmetric. Expanding equation (3) provides:

$$Hxx = Hxx'\cos(\phi)^2 + Hyy'\sin(\phi)^2$$

$$Hyy = Hxx'\sin(\phi)^2 + Hyy'\cos(\phi)^2$$

$$Hxy = (Hxx' - Hyy')\sin(\phi)\cos(\phi)$$

$$Hxz = Hxz'\cos(\phi) \quad (7)$$

which further yields:

$$\tan(2\varphi) = \frac{2Hxy}{Hxx - Hyy}; \quad (8)$$

wherein:

$H_{xy}$ represents a normalized and corrected cross-component;

$H_{xx}$ represents a normalized main-component in an X direction; and, $H_{yy}$ represents a normalized main-component in an Y direction.

The relative tool rotation angle (φ) can then be calculated from equation (8). Because the inverse of tan(2φ) provides an angle within the range between negative (π) and positive (π), the relative tool rotation angle (φ) should be adjusted to a positive value based on the signs of ($H_{xy}$) and ($H_{xx}-H_{yy}$). When the relative tool rotation angle (φ) is greater than 180 degrees, equation (8) is no longer sufficient to uniquely determine the relative tool rotation angle (φ). In this case, estimation of the relative tool rotation angle (φ) can be addressed by combining with the signs of ($H_{xz}$). Aspects of this combination are depicted in FIG. 7.

Figure 7:
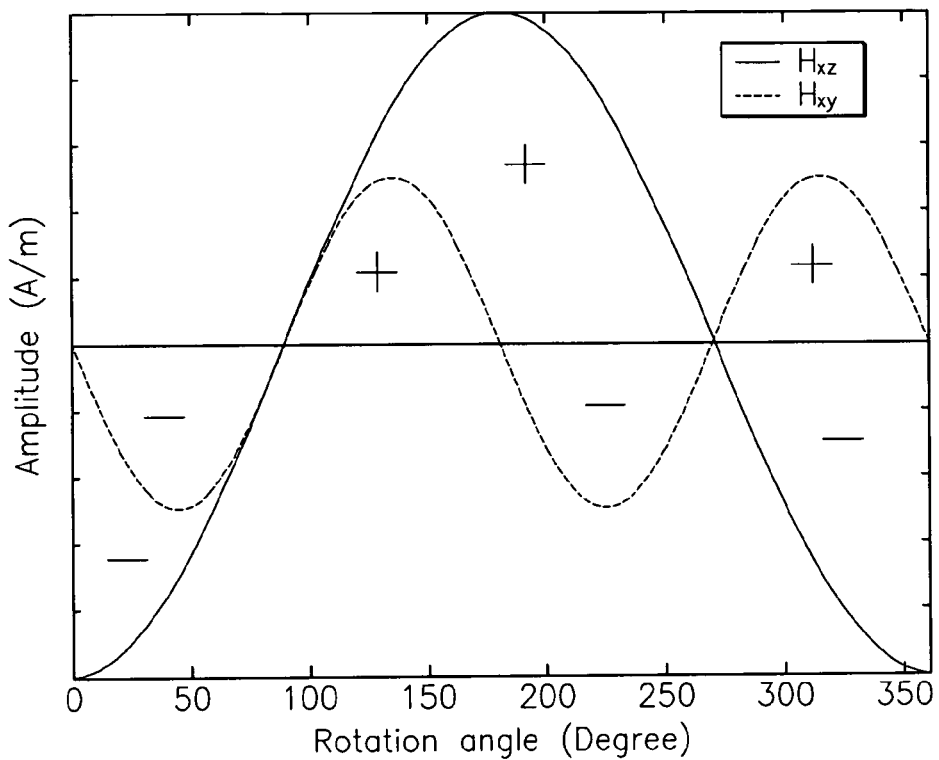
FIG. 7 depicts sign changes of $H_{xy}$ and $H_{xz}$ with respect to rotation angle $\phi$.

Referring to FIG. 7, there are shown sign changes of ($H_{xy}$) and ($H_{xz}$) with respect to the relative tool rotation angle (φ) and sine and cosine wave forms.

Techniques for relative tool rotation angle (φ) calculation 520 and rotating 530 the results are known. Exemplary techniques are disclosed in the document entitled "Simultaneous determination on relative angles anisotropic resistivity using multi component induction logging data" by Zhang et al., SPWLA 42nd Annual Logging Symposium, 2001; and, the document entitled "Foundations of Tensor Induction Well Logging" by Zhdanov et al., Petrophysics, November-December 2001. The disclosures of these documents are incorporated by reference herein in their entirety.

Rotating 530

Once the relative tool rotation angle (φ) has been determined, rotating 530 of corrected components is performed. Using the relative tool rotation angle (φ) as an input, the following relations may be used:

$$H'_{xz} = \frac{H_{xz}}{\cos(\varphi)}; \quad (9)$$

$$Hxx' = \frac{H_{xx}\cos(\varphi)^2 - Hyy\sin(\varphi)^2}{\cos(2\varphi)}; \text{ and,} \quad (10)$$

$$Hyy' = \frac{Hyy\cos(\varphi)^2 - Hxx\sin(\varphi)^2}{\cos(2\varphi)}. \quad (11)$$

When (φ)=90 degrees or 270 degrees, ($H_{xz}'$) is undefined and can not be used as input for neural network predictions. However, in typical well logging, the relative tool rotation angle (φ) is not usually maintained at 90 degrees or 270 degrees. Therefore, analysis of depth points can be skipped. In instances where the relative tool rotation angle (φ)=45 degrees (2n+1), the equations (10) and (11) are typically not used. In such instances, ($H_{xx}'$) and ($H_{yy}'$) can be obtained by solving the following least-squares approach:

$$\begin{pmatrix} Hxx \\ Hyy \\ Hxy'' \end{pmatrix} = \begin{pmatrix} \cos(\varphi)^2 & \sin(\varphi)^2 \\ \sin(\varphi)^2 & \cos(\varphi)^2 \\ \sin(\varphi)\cos(\varphi) & -\sin(\varphi)\cos(\varphi) \end{pmatrix} \begin{pmatrix} Hxx' \\ Hyy' \end{pmatrix}, \quad (12)$$

where ($H_{xy}''$) corresponds to the spacing corrected field. Although equation (12) may be used for any rotation angle (φ), some error will be introduced from ($H_{xy}''$). Therefore, it is not recommended that equation (12) be used for a general rotation. Typically, use of equations (9)-(11) provides for less error in the rotating 530 the corrected components.

Dip Angle Prediction 540

Determination of the formation dip angle (θ) is typically completed by use of the neural network 110 is trained to reflect the relationship between the formation dip angle (θ) and the corrected components determined during the MFF processing 510. The neural network 110 is typically trained using synthetic MFF responses for components ($H_{xx}'$), ($H_{yy}'$), ($H_{zz}$), ($H_{xz}'$) of various one-dimensional models. These models are typically selected for the zero relative tool rotation angle (φ) and different formation dip angles (θ), typically ranging between about 0 degrees to about 75 degrees.

Use of neural networks is advantageous for a variety of reasons. For example, although for a thick formation 4 layer an approximation exists, shoulder bed effects usually affect or destroy the accuracy of the formation dip angle (θ) determination. Simultaneously, inverting the relative formation dip angle (θ') and the resistivity measurements has proven to be a time consuming approach. Moreover, inversion requires selection of a proper window for the inversion.

Regarding the use of neural networks and a desire to minimize the effects of conductivity in the models used, those components normalized with the rotation invariant summation $(H_{xx}')+(H_{yy}')+(H_{zz})$ are used as inputs thereto. It is important to note that the summation remains dependent upon the formation dip angle (θ) since the relative location of the transmitter coils 101, 103, 105 and the receiver coils 107, 109, 111 changes with changes in the formation dip angle (θ). Accordingly, a three-layer neural network model with ten hidden neurons in a hidden layer is used. In this case, the neural network input is the four corrected MFF-processed components. The output of the neural network 110 will be the formation dip angle (θ). The effects of training can be evaluated by checking the errors between the predicted formation dip angles (θ) and the true formation dip angles (θ).

Figure 8:
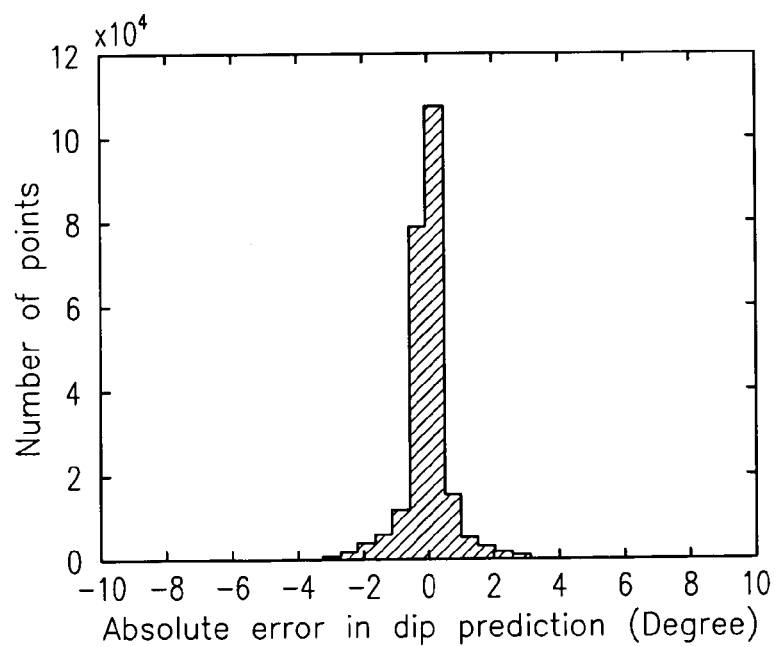
FIG. 8 is a histogram depicting statistical error in predictions for dip angles.

Referring to FIG. 8, a histogram for the errors is shown. The histogram depicts that a majority of the statistical error between the predicted formation dip angle (θ) and the actual formation dip angle (θ) is within about one degree.

Figure 9:
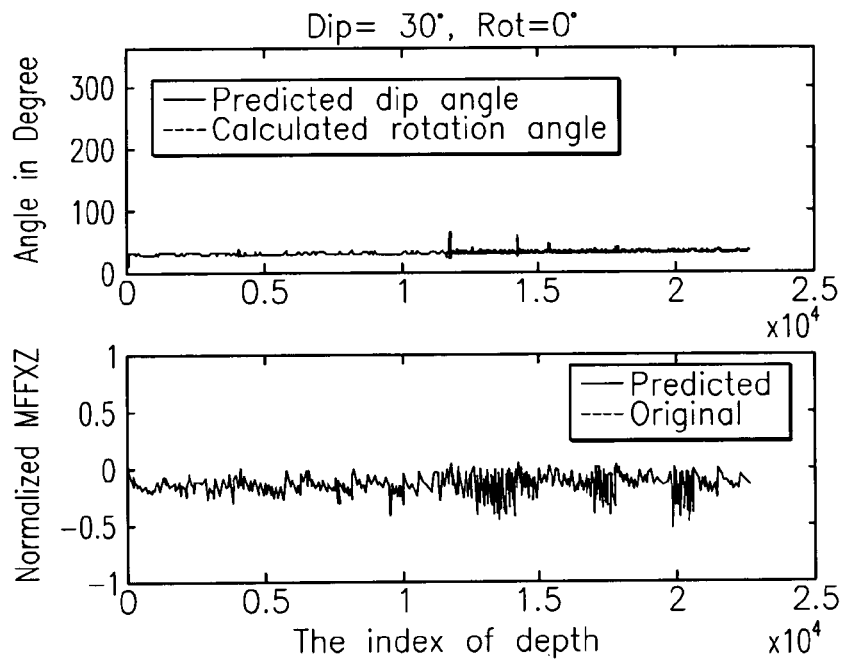
FIG. 9 through FIG. 14 depict results of calculations and predictions for the training model.
Figure 10:
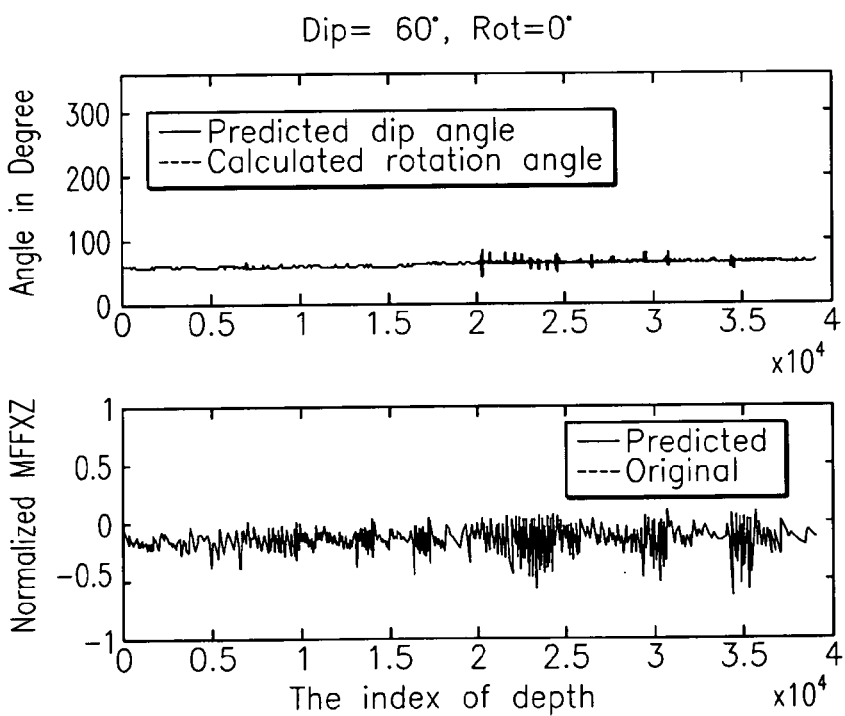
Figure 11:
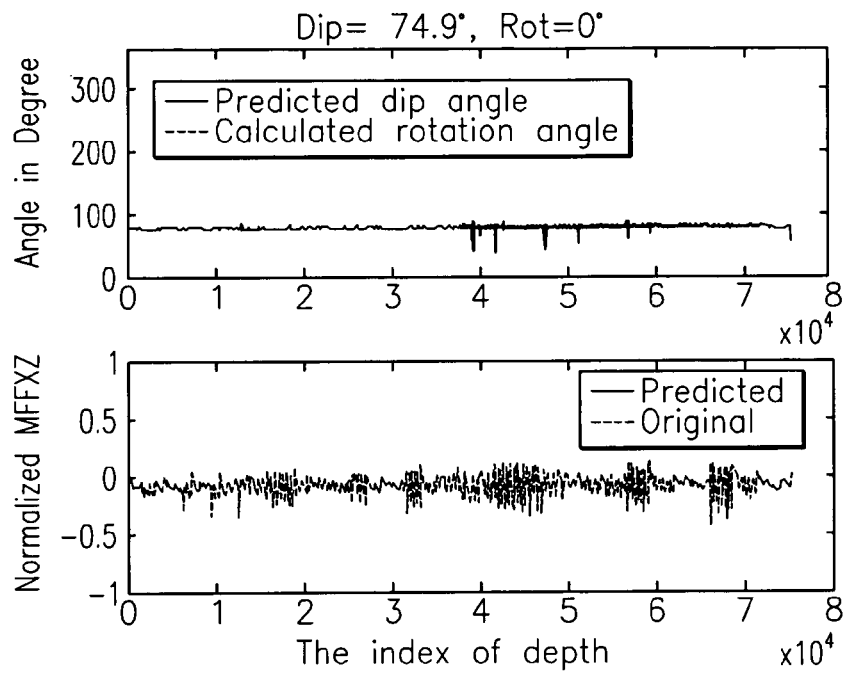
Figure 12:
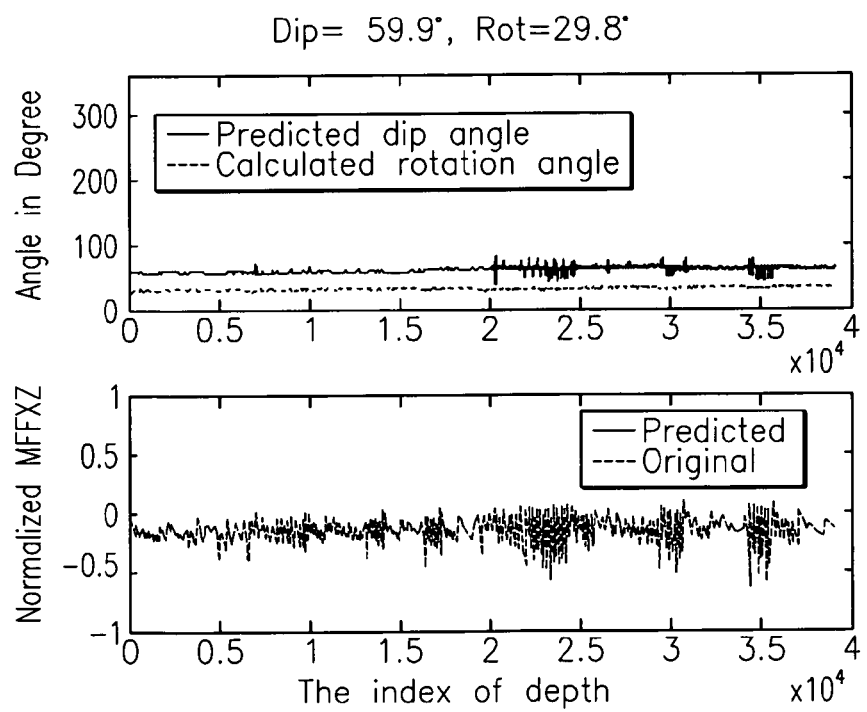
Figure 13:
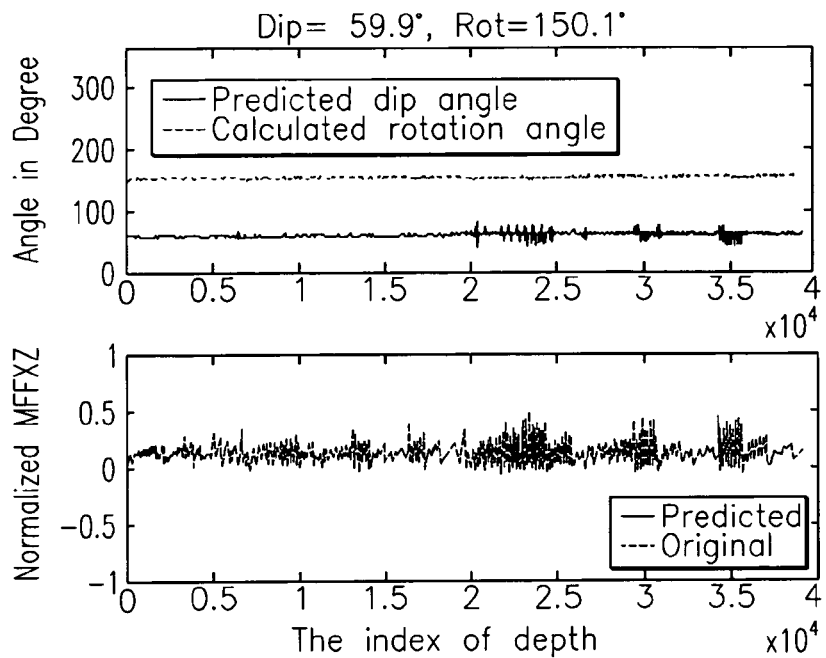
Figure 14:
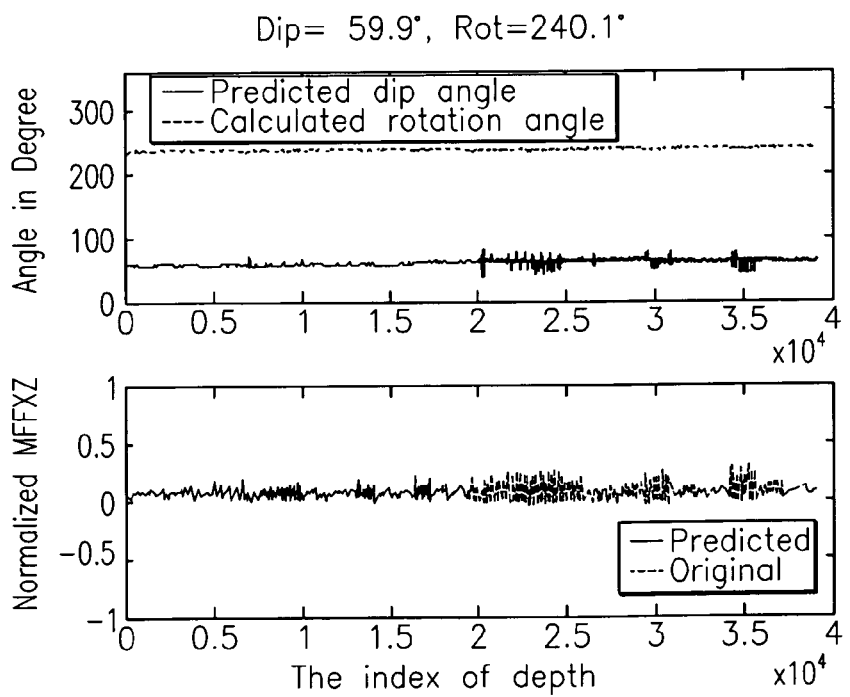

FIG. 9 through FIG. 14 depicts results for calculations and predictions for the training model. Referring to FIG. 9, results of calculation and predictions for the training model with formation dip angle (θ) of about 30 degrees and the relative tool rotation angle (φ) at about 0 degrees are shown. Referring to FIG. 10, results of calculation and predictions for the training model with formation dip angle (θ) of about 60 degrees and the rotation angle (φ) at about 0 degrees are shown. Referring to FIG. 11, results of calculation and predictions for the training model with formation dip angle (θ) of about 75 degrees and the rotation angle (φ) of about 0 degrees are shown. Referring to FIG. 12, results of calculation and predictions for the training model with formation dip angle (θ) of 60 degrees and the rotation angle (φ) of about 30 degrees are shown. Referring to FIG. 13, results of calculation and predictions for the training model with formation dip angle (θ) of 60 degrees and the rotation angle (φ) of about 150 degrees are shown. Last of all, FIG. 14, depicts results of calculation and predictions for the training model with formation dip angle (θ) of 60 degrees and the rotation angle (φ) of about 240 degrees.

Figure 15:
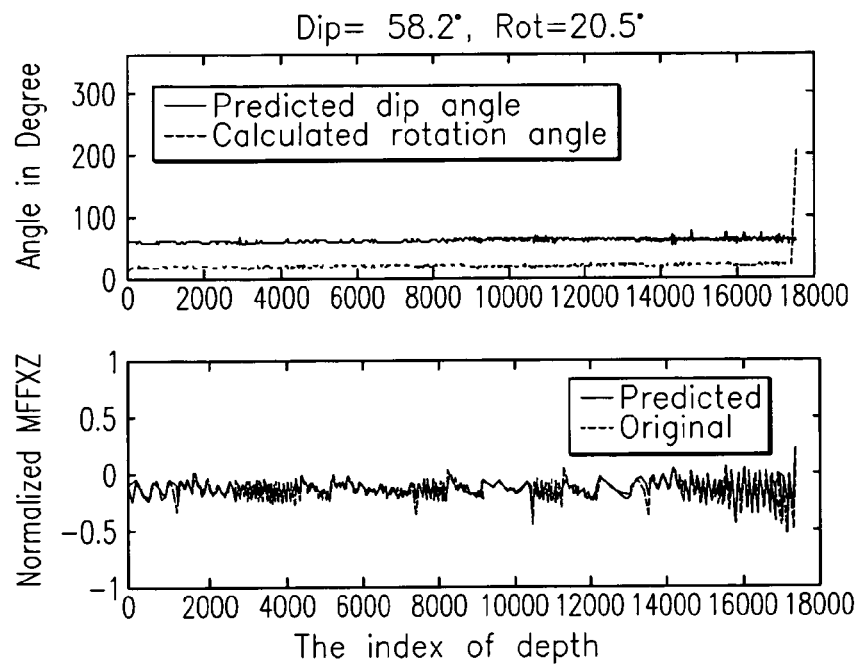
FIG. 15 through FIG. 17 depict results of calculations and predictions for the training that are derived from actual measurements; and, FIG. 18 provides comparisons of formation angles and relative dip angles between the exemplary algorithm and inversion technique.
Figure 16:
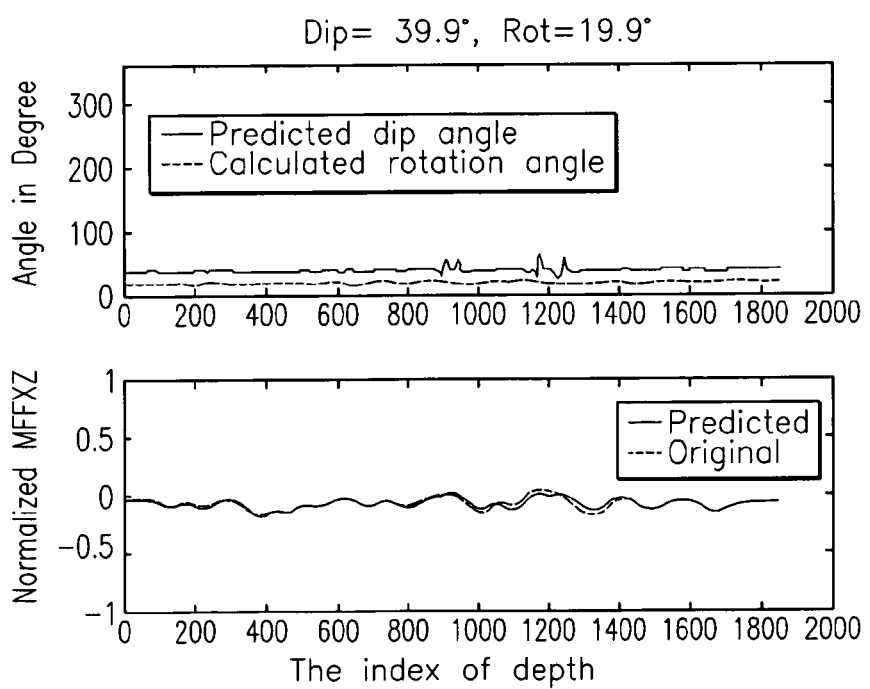
Figure 17:
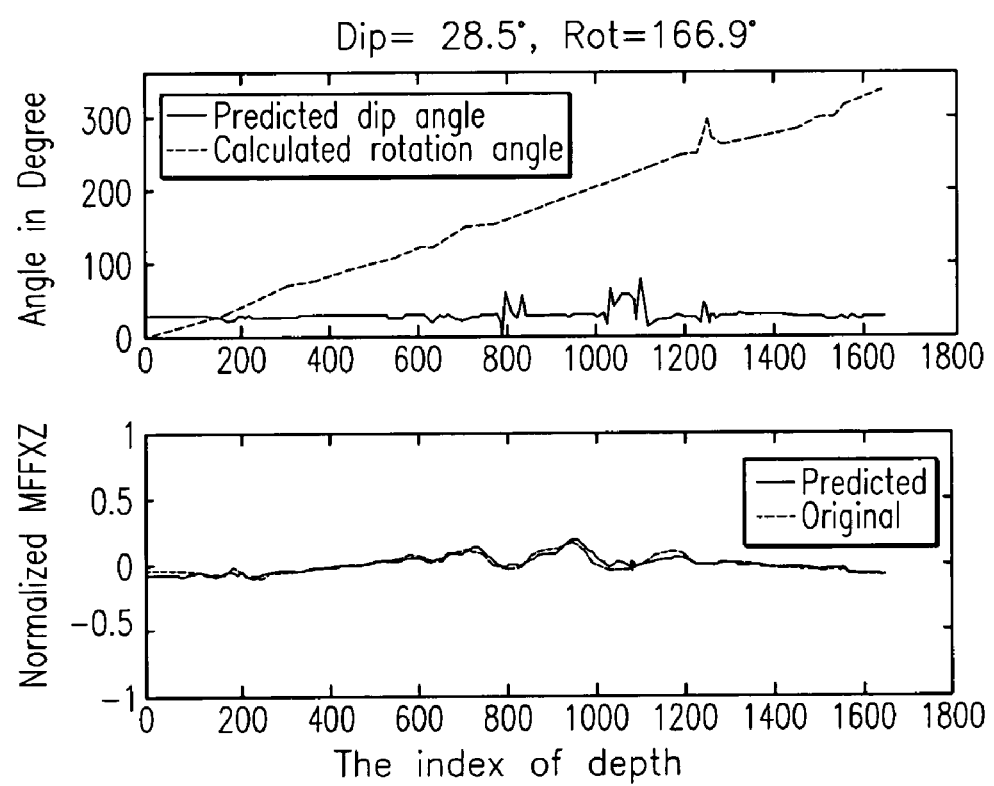
Figure 18:
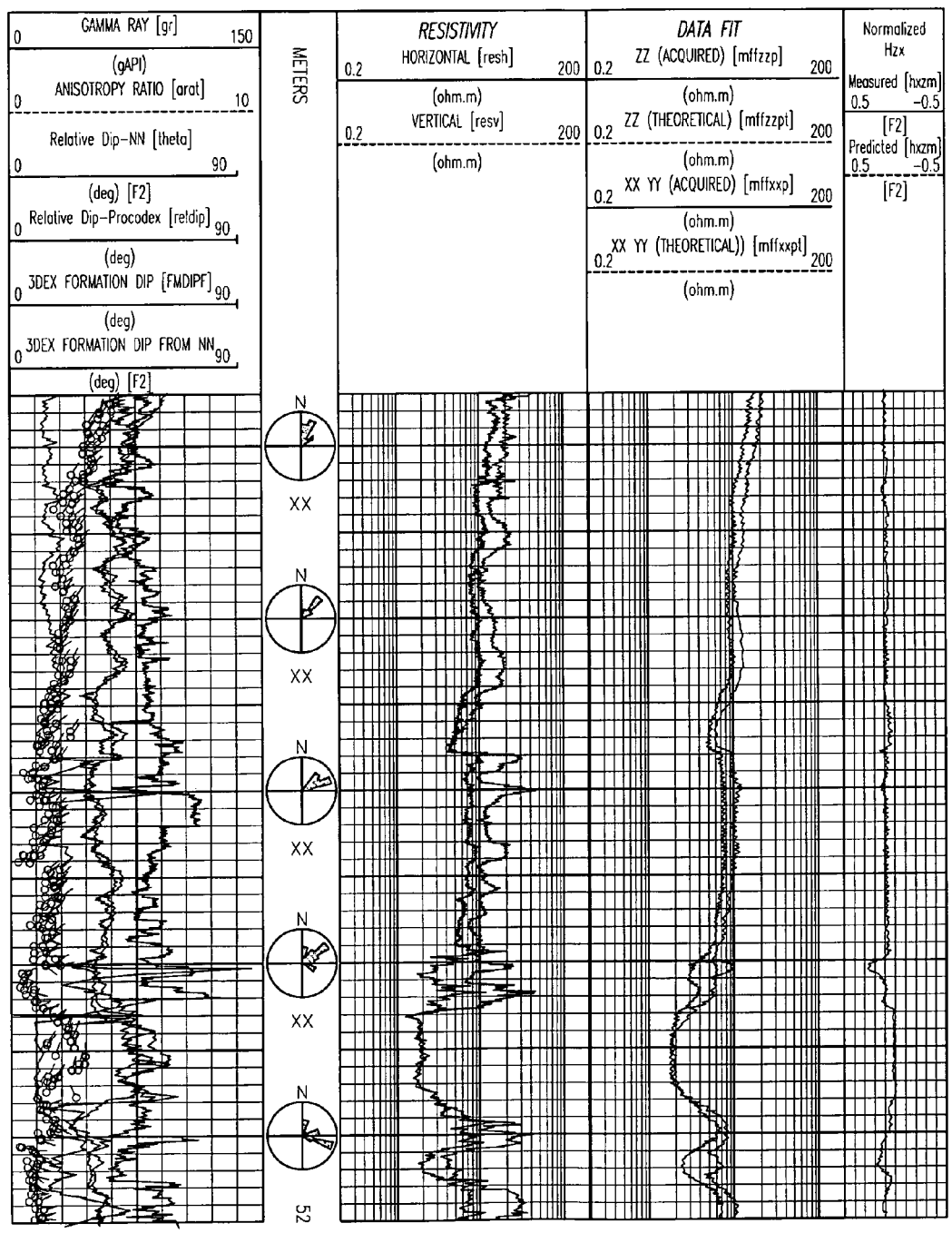

In order to validate the process, several tests were conducted. The first test used the same model profile as that for the training. However, in the first test a different formation dip angle was used. Results of the first test are depicted in FIG. 15. The second test used a model profile derived from actual well log data. The second test used a constant formation dip angle and a constant rotation angle. Results for the second test are depicted in FIG. 16. The third test used the same model profile as in the second test, but varied the rotation angles between about 0 degrees to about 360 degrees. In the third test, formation dip angles (θ) were also varied from about 30 degrees to about 45 degrees. Results for the third test are depicted in FIG. 17. A final test applied the entire algorithm to the actual well log data. Results from application of the exemplary algorithm are compared with those from the inversion technique and shown in FIG. 18. Both the formation azimuth angle (Φ) and the formation dip angle (θ) are in generally or substantially in agreement with each other (refer to tadpole plots depicted in the first track). Also the relative formation dip angles (θ) produced by the neural network approach and by the inversion technique show an excellent agreement. These results are depicted in graph under the first column.

In general, it is considered that when the cross-component $(H_{xy})$ is close to zero, the relative tool rotation angle (φ) may be difficult to determine. For example, when the rotation is arbitrarily selected in a thick isotropic layer of the formation 4. For such a case, a user may either skip an associated data point or accept the previous relative rotation angle (φ) as the value for the data point. It is also recognized that when the cross-component $(H_{xz})$ is close to zero, the rotation angle (φ) may be determined with a 180 degree uncertainty. Once the relative formation dip angle (θ') and the relative tool rotation angle (φ) are determined, the user can obtain the formation dip angle (θ) and formation azimuth angle (Φ) by the following formulas:

$$\text{dip}=\cos^{-1}\theta \tag{13}$$

$$\theta=\cos(DEV)\cdot\cos(\theta')+\sin(DEV)\cdot\sin(\theta')\cdot\cos(\phi) \tag{14}$$

$$\Phi=DAZ-\tan^{-1}(b,c) \tag{15}$$

where:
  $b=-\sin(\theta')*\sin(\phi)$,
  $c=-\sin(DEV)*\cos(\theta')+\cos(DEV)*\sin(\theta')*\cos(\theta')$, and
where:
  DEV represents deviation in the wellbore,
  DAZ represents azimuth drift in the wellbore,
  (θ') represents the relative formation dip angle, and
  (φ) represents the relative tool rotation angle.

After the above calculations are completed, the formation horizontal and vertical resistivities can be obtained by use of software for performing inversions.

Synthetic model studies show that the relative tool rotation angle (φ) can be determined within an accuracy of about 0.5 degrees, whereas the relative formation dip angle (θ) can be determined within an accuracy of about 2 degrees, with exceptions as noted above. Both synthetic and real data examples demonstrate the data quality can be well monitored by the prediction of cross-components from the main components.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a formation property, the method comprising:
   using a tool to collect a plurality of component measurements from the formation;
   performing multi-frequency focus (MFF) processing to at least one of reduce and eliminate near-borehole effects; and,
   using a neural network to estimate the formation property.

2. The method as in claim 1, wherein the formation property comprises at least one of a horizontal resistivity for a formation, an anisotropy coefficient for a formation, a formation dip angle, a rotation angle for a tool, and a thickness for a formation.

3. The method as in claim 1, wherein performing MFF processing comprises solving a relationship comprising:

$$H_{MFF} = \frac{1}{K}\sin(\sigma_{MFF}) \cdot |\sigma_{MFF}|^{1.5};$$

wherein:
K represents a constant describing aspects of the tool;
H represents magnetic field data; and
σ represents conductivity.

4. The method as in claim 3, further comprising:
rotating corrected components to a direction where a value for one of the cross-components becomes zero.

5. The method as in claim 4, wherein rotating comprises solving a relationship comprising:

$$\begin{pmatrix} Hxx \\ Hyy \\ Hxy'' \end{pmatrix} = \begin{pmatrix} \cos(\varphi)^2 & \sin(\varphi)^2 \\ \sin(\varphi)^2 & \cos(\varphi)^2 \\ \sin(\varphi)\cos(\varphi) & -\sin(\varphi)\cos(\varphi) \end{pmatrix} \begin{pmatrix} Hxx' \\ Hyy' \end{pmatrix};$$

where:
$H_{xy}''$ represents a normalized and corrected $H_{xy}$ cross-component;
$H_{xx}$ represents a normalized main-component in an X direction;
$H_{yy}$ represents a normalized main-component in an Y direction;
(φ) represents the rotation angle;
$H_{xx}'$ represents a rotated $H_{xx}$ component; and,
$H_{yy}'$ represents a rotated $H_{yy}$ component.

6. The method as in claim 4, further comprising:
processing the rotated components to provide normalized components.

7. The method as in claim 6, further comprising determining a quality of the estimate by:
comparing at least one of the corrected, rotated and normalized components to a corresponding component measurement; and,
determining the quality of the estimate by the comparing.

8. The method as in claim 1, wherein measurement data comprises a plurality of frequency measurements.

9. The method as in claim 1, wherein a rotation angle (φ) for the tool is determined from a relationship comprising:

$$\tan(2\varphi) = \frac{2Hxy''}{Hxx - Hyy};$$

where:
$H_{xy}''$ represents a normalized and corrected $H_{xy}$ cross-component;
$H_{xx}$ represents a normalized main-component in an X direction; and,
$H_{yy}$ represents a normalized main-component in an Y direction.

10. The method as in claim 1, wherein an input to the neural network comprises normalization with a rotation invariant summation comprising the relationship:

$(H_{xx}')+(H_{yy}')+(H_{zz});$ where:
$H_{xx}'$ represents a rotated $H_{xx}$ component;
$H_{yy}'$ represents a rotated $H_{yy}$ component; and,
$H_{zz}$ represents a normalized main-component in an Z direction.

11. The method as in claim 1 comprising using the neural network on a real time basis.

12. The method as in claim 1 comprising providing the estimate during drilling of a wellbore.

13. A method for training a neural network comprising:
selecting a model representing a formation;
computing a synthetic data set for the plurality of component responses projected for running a logging tool within a formation correlating to the model, wherein the synthetic data set is generated using a one-dimensional code; and,
loading the synthetic data set and the model into the neural network.

14. The method as in claim 13, wherein the model comprises at least one of a horizontal resistivity for the formation, an anisotropy coefficient for the formation, a formation dip angle, a rotation angle for a tool, and a thickness for the formation.

15. The method as in claim 13, wherein the synthetic data set is generated for at least one aspect of the formation comprising at least one of a plurality of horizontal resistivities, a plurality of anisotropy factors, a plurality of thicknesses, a plurality of formation dip angles and a plurality of rotation angles for the tool.

16. The method as in claim 13, wherein the synthetic data set comprises at least one of corrected, rotated and normalized measurement data.

17. A computer program product stored on machine readable media comprising directions for estimating a formation property, the directions comprising instructions for:
using a tool to collect a plurality of component measurements from the formation; and
performing multi-frequency focus (MFF) processing to at least one of reduce and eliminate near-borehole effects in the measurements.

18. The computer program product as in claim 17, further comprising instructions for determining a quality of the estimating by:
comparing at least one of rotated, corrected and normalized components to a corresponding component measurement; and,
determining the quality of the estimating by the comparing.

19. The computer program product as in claim 17 further comprising instructions for producing commands for the collecting.

20. The computer program product as in claim 17 further comprising directions for estimating the formation property during drilling of a wellbore.

21. A multi-component well logging induction tool, comprising:
a plurality of transmitter coils and a plurality of receiver coils for providing resistivity measurement data, each plurality coupled to electronics which are also coupled to a processor for receiving the measurement data for main-components and cross-components of the resistivity measurements;
wherein the processor comprises machine readable instructions for performing multi-frequency focus (MFF) processing of the measurement data to one of reduce and eliminate at least one of near-borehole effects and spacing bias to produce corrected components;

rotating each of the corrected components to a direction where one of the cross-components becomes zero;

providing normalized components for the main-components and the cross-components;

using a neural network, estimating a formation property; and determining a quality of the estimate by comparing at least one of the corrected, rotated and normalized components to a corresponding resistivity measurement; and, determining the quality of the estimate by the comparing.

22. The multi-component well logging induction tool of claim 21 comprising adaptations for use during at least one of well drilling and well logging.

* * * * *